United States Patent Office 3,284,444
Patented Nov. 8, 1966

3,284,444
AZIRIDINE DERIVATIVES
John E. Franz, Crestwood, and Carl Osuch, Kirkwood, Mo., assignors to Monsanto Company, a corporation of Delaware
No Drawing. Filed Jan. 4, 1963, Ser. No. 249,313
2 Claims. (Cl. 260—239)

This invention relates to a novel class of ethylene imine derivatives. More particularly, the invention is directed to ethylene imine derivatives obtained by the reaction of strained double bonded cyclic systems with specific types of organic azides. The azides utilized in preparing the compounds of the present invention are those obtained by the reaction of an alkali metal azide with a reactive "acid-type" halide. The aziridine-type compounds thus prepared have been found to exhibit exceptional utility as polymer intermediates.

The novel ethylene imine derivatives of the present invention are prepared from the reaction of olefins of the type,

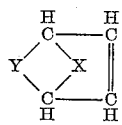

wherein X is sulfur, oxygen, an amino group, or a divalent hydrocarbon containing from 1 to 3 carbon atoms, and Y is a divalent hydrocarbon radical containing at least two carbon atoms, with azides of the type, $$N_3Z$$

wherein Z is a radical selected from —SO$_2$R, —PORR', —PSRR' and —SiRR'R'' groups; and R, R' and R'' are alkyl, cycloalkyl, aryl, aralkyl, heterocyclic, alkyloxy, cycloalkyloxy, aryloxy, aralkyloxy, alkylamino or arylamino radicals containing from one to 18 carbon atoms. The products of the present invention prepared by this reaction have the following general formula:

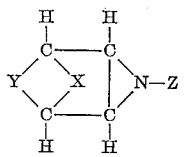

wherein X, Y and Z are as defined above. When Y is saturated, monomeric products are obtained. However, when Y contains ethylenic unsaturation, polyaziridines are prepared by reacting the diene with a diazide of the type, N$_3$ZN$_3$. More specifically, the diazides have the following general formulas:

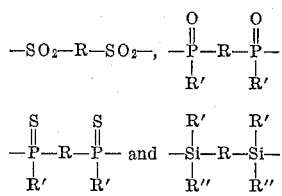

in which R, R' and R'' have the above-defined identities. The polyaziridines thus obtained can be represented by the general formula:

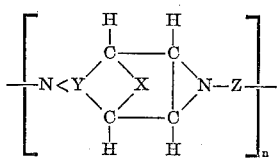

wherein n is a whole number greater than one.

In addition to the compounds set forth above, by-products in which an azide nitrogen is added to only one carbon atom of the cyclic system through a double bond linkage are also formed. These by-products have the formula,

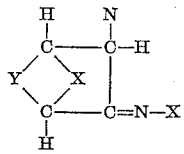

in which X, Y and Z are identified as in the aziridine-type compounds.

As illustrated in the formula, this invention is primarily concerned with aziridine derivatives in which the imine nitrogen is directly linked to an "acid-type" radical of the class described above; also, by-products in which the nitrogen is not added across the double bond of an unsaturated cyclic compound. Both types of ethylene imine derivatives can be employed as intermediates in the formation of homopolymers or copolymers.

It is an object of this invention to provide new and novel ethylene imine derivatives and methods of preparing them. An additional object is to provide novel and improved polymer or resin intermediates.

These and other objects are accomplished in accordance with the present invention by reacting an unsaturated strained cyclic compound with an acid-type azide. The unsaturated cyclic reactant can be di- or polycyclic. Suitable cyclic compounds include cyclopentadiene and methylcyclopentadiene dimers, trimers and tetramers, bicycloheptadiene, acenaphthylene, α-thujene, β-thujene, bornylene, p-fenchene, and the like. Diels-Alder products of cyclopentadienes and similar compounds with maleic acid and other dienophiles can also be used as the cyclic reactant in accordance with the present invention. Representative Diels-Alder adducts which can be employed in accordance with the present invention include, for example, those formed by the reaction of the cyclic compounds recited above with dibasic acids and their derivatives, such as maleic anhydride, maleimide, fumaric acid, chloromaleic anhydride, dichloromaleic anhydride, and the like; monobasic acids and derivatives such as acrylic acid, acrylates, crotonic acid, 2-methyl-2-butenoic acid, methacrylic acid and the like; aldehydes such as acrolein, crotonaldehyde, methylacrolein and the like; ketones such as propenyl methyl ketone, vinyl phenyl ketone, vinyl propenyl ketone, vinyl methyl ketone and the like; ketenes such as ketene, diphenylketene, dimethylketene and the like; vinyl compounds, including ethylene, propylene, styrene, vinyl acetate, vinyl chloride, vinylidene chloride, allyl alcohol, allyl nitrile, allyl amine and the like; acetylenes such as acetylene, acetylenedicarboxylic acid esters, acetylenedicarbonitrile and the like; quinones such as p-benzoquinone, 1,4-naphthaquinone and the like; acrylonitrile; nitroolefins such as nitroethylene, 1- and 2-nitropropenes, 2-nitro-2-butene and the like; and azobis compounds such as azobisdiethylcarboxylate and the like. Related compounds, such as aldrin, dicyclopentadiene dicarboxylic acid, dicyclopentadiene tricarboxylic acid and the like, can also be used as reactants in preparing the aziridines of the present invention.

Substantially all of the acid-type azides containing between one and 18 carbon atoms in each of their hydrocarbon groups can be utilized in the reactions of the present invention. The term "acid-type azide" is used herein to designate azides in which the nitrogen group is linked to the remainder of the molecule through an intervening sulfur, phosphorus or silicon atom. Thus this term encompasses sulfonyl, phosphoryl, sulfamoyl, thiophosphoryl, phosphonyl, thiophosphonyl, phosphinyl, thiophosphinyl, —PO(NR$_2$)$_2$, silyl, and similar azides. Satisfactory sul-

Calculated for $C_{17}H_{29}SO_2N$ (301.42): C, 67.74%; H, 6.35%; N, 4.65%; S, 10.64%. Found: C, 67.4%; H, 6.2%; N, 4.7%; S, 10.3%.

Example 5

About 1.83 grams (0.01 mol) of benzenesulfonyl azide, about 3.3 grams (0.02 mol) of endomethylenetetrahydrophthalic anhydride, and 3 ml. of benzene are heated under reflux at about 80° C. for about 24 hours in a suitable reaction vessel. After about 3½ hours at this temperature, the imine derivative begins to precipitate as a colorless solid and continues to separate until the reaction is complete. At the end of this period, the reaction mixture consists of a low viscosity, yellow oil and the solid product. The precipitated material is then separated from the oil by decantation, washed repeatedly with benzene, and dried. The aziridine derivative thus obtained is a colorless crystalline solid melting at about 224° C. and having a molecular weight of 319. Its empirical formula of $C_{15}H_{13}NO_5S$ and the following structure,

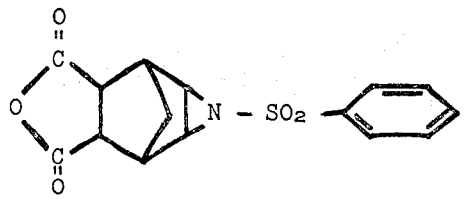

are ascertained by infrared and chemical analysis.

Calculated: C, 56.41; N, 4.07%. Found: C, 55.9%; N, 4.2%.

Example 6

About 1.21 grams (0.01 mol) of methylsulfonyl azide are added to a solution of 1.88 grams (0.02 mol) of norbornylene in 5 ml. of acetonitrile, and warmed to about 40° C. After about 16 hours at this temperature, the reaction is complete, and the solvent is removed by distillation. The adduct thus obtained is a light yellow oil having the formula,

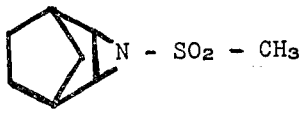

as confirmed by infrared spectrum.

Example 7

About 1.7 grams (0.01 mol) of the adduct of furan and maleic anhydride is added to about 1.8 grams (0.01 mol) of benzenesulfonyl azide dissolved in 5 ml. of acetonitrile. The reaction mixture is then heated under reflux at about 80° C. for one hour and cooled to room temperature. After the solution has cooled, an equal volume of ether is added thereto, and a white crystalline material is precipitated from the purple solution. After being separated from the mother liquor by filtration, the aziridine is purified by recrystallization from acetonitrile to provide a product melting at 232° C. The formation of the derivative is in general accordance with the following equation:

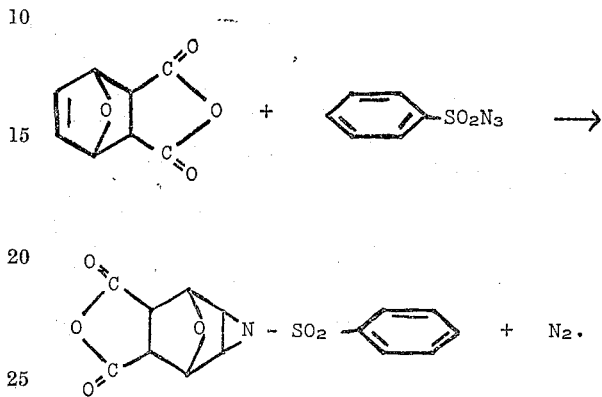

The above structure is supported by the following analysis:

Calculated for $C_{14}H_{11}NO_6S$: C, 52.35%; H, 3.32%; N, 4.36%. Found: C, 52.4%; H, 3.4%; N, 3.93%.

Example 8

A solution of 0.38 gram (0.001 mol) of bis-(p-sulfonazido)-diphenylether in 5 ml. of dimethylformamide is mixed with 0.25 gram (0.02 mol) of norbornylene at room temperature. Upon addition of the norbornylene, the clear solution turns yellow, and nitrogen is evolved at a steady rate. The reaction mixture is maintained at room temperature for about 24 hours to insure completion of the reaction. At the end of this period, the reaction mixture is converted to a semisolid mass which is extracted with ether until the extracts are colorless. The aziridine product remains as a granular yellow residue melting at 197–203° C. The crude yellow product is dissolved in a minimum amount of chloroform, and ethyl ether is added to the solution. This results in the precipitation of a small amount of yellow sludge which is removed by centrifugation. The resulting clear solution is then diluted with petroleum ether, and the purified product is precipitated as an off-white crystalline material in yields representing approximately 68% of theoretical, based on the amount of the azide employed. The purified material melts at 198–200° C. The reaction involved in this example is:

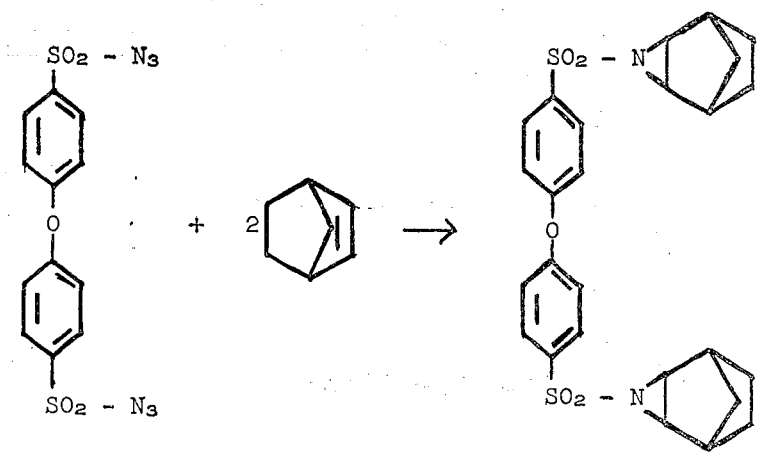

The above structure conforms with infrared spectral analysis.

*Example 9*

This example is directed to the preparation of the aziridine derivative obtained by positioning a nitrogen atom from diethylsulfamyl azide across the double bond of norbornene. In preparing this compound, a solution of approximately 3.58 grams (0.02 mol) of diethylsulfamyl azide and about 3.82 grams (0.04 mol) of norbornene in approximately 20 ml. of acetonitrile is heated under reflux for about 12 hours. The solution is then evaporated under reduced pressure to remove the solvent and any excess norbornene. The residue from the evaporation is extracted with ether to obtain a mobile, yellow oil whose analysis indicates that it is a mixture of the aziridine together with the imine-type product. This oil is absorbed on a basic alumina colmun and then eluted with diethyl ether to obtain a practically colorless oil having a refractive index of 1.4941 at 25° C. This oil is free of azide bonds, and its analysis shows that it is the aziridine product of norbornene with diethylsulfamyl azide.

*Example 10*

This example illustrates the preparation of a polymeric product in general accordance with the following reaction:

$$N_3 - SO_2 - C_6H_4 - C_6H_4 - SO_2 - N_3 \quad + \quad \text{[bicycloheptadiene]} \quad \rightarrow$$

$$\left[ -N \diagup\diagdown N - SO_2 - C_6H_4 - C_6H_4 - SO_2 - \right]_n$$

About 3.64 grams (0.01 mol) of the diazide are added to approximately 0.91 gram (0.01 mol) of bicycloheptadiene dissolved in 5 ml. of acetonitrile. The addition is made at room temperature and with agitation. The reaction proceeds rather slowly and is accompanied by a mild, uniform evolution of nitrogen. After about 3–4 hours, the nitrogen liberation ceases, indicating completion of the reaction. The resultant brown, relatively soft material thus formed is separated from the reaction mixture by filtration and dried in a vacuum oven for about 6 hours at 80–90° C. to obtain a brittle resinous material. Infrared special analysis of this product confirms the above structure.

Additional exemplary compounds which are prepared by reacting appropriate unsaturated strained cyclic compounds with acid-type azides in accordance with the procedures described above include:

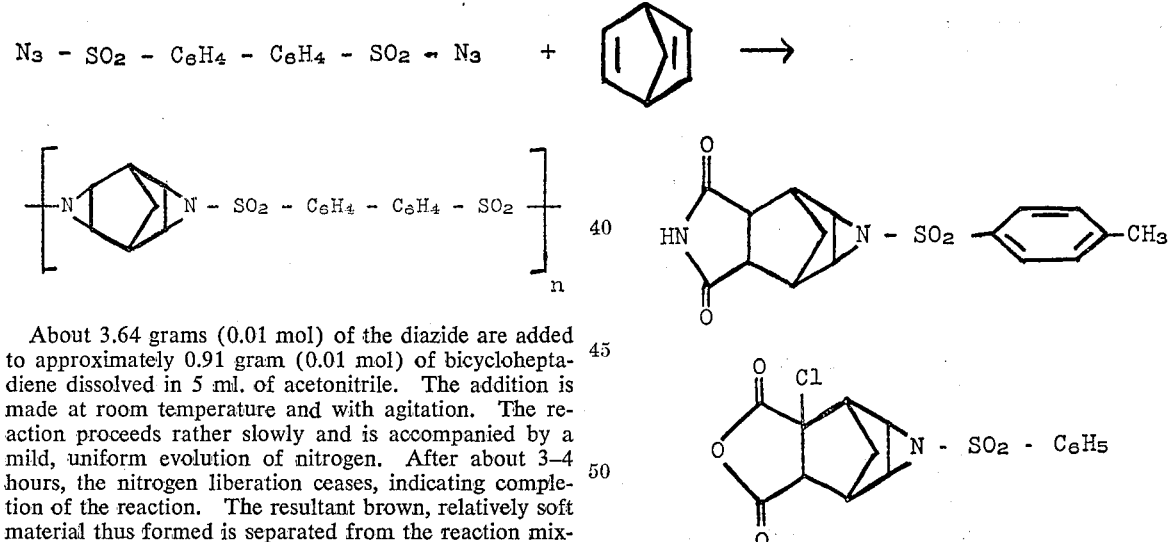

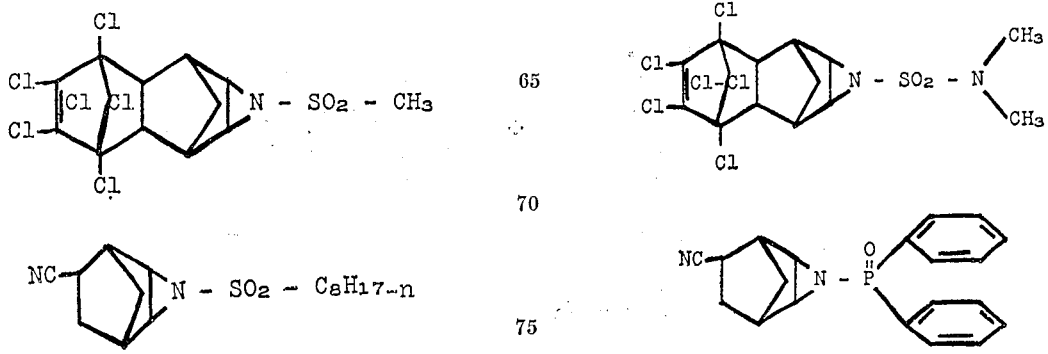

While each of the above compounds is derived from sulfonyl azides, corresponding aziridine derivatives of sulfamyl, phosphonyl, thiophosphonyl, phosphinyl and thiophosphinyl azides are also readily prepared by the present invention. Among representative compounds obtained by the reactions of these groups of azides are:

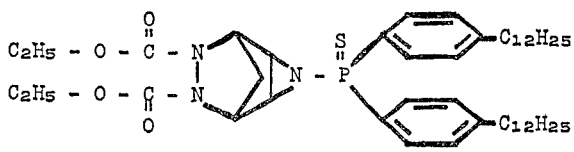

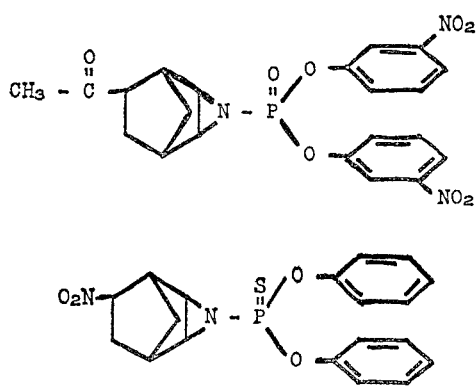

The ethylene imine derivatives obtained by the present process are readily polymerized by heating them above their melting points, preferably in the presence of an acid which serves as a catalyst. Interpolymers of the ethylene imine derivatives of the present invention are prepared with equal facility. These polymeric substituted ethylene imine derivatives are oils or high-melting solids insoluble in most commercially available solvents and resistant to the action of alkalies and acids. The solid products can be used for molding articles of commerce, as coating compositions, and in similar applications. On the other hand, the oily polymers are useful per se as lubricants and plasticizers.

The difunctional aziridines of the present invention can also be polymerized with polyfunctional alcohols in the formation of solid synthetic resins. Suitable alcohols for use in this capacity include aliphatic and aromatic alcohols containing at least two hydroxy groups. Representative alcohols that can be employed include ethylene glycol, glycerol, 2-butene-1,4-diol, pentaerythritol, glucose, diethanolamine, triethanolamine, tris(hydroxymethyl)aminomethane, resorcinol, phloroglucinol, bisphenol A, hydrogenated bisphenol A, and the like. They can also be polymerized with methylol phosphorus compounds in the formation of resins particularly well suited as flameproofing coating compositions. In addition, the difunctional aziridines copolymerize with dicarboxylic acids, such as maleic and phthalic acids. The polymeric materials obtained from the present derivatives exhibit utility in the production of molded plastic articles, protective coatings, agents for the treatment of paper, textiles and leather, and in other capacities.

The above description has been primarily directed to the formation of ethylene imine derivatives obtained by the reaction of acid-type azides with unsaturated strained cyclic compounds. Similar advantageous results can be obtained by using a vinyl-type compound in which the vinyl group is attached to at least one electron-rich hetero atom such as oxygen, sulfur or phosphorus. The reaction products of these compounds can also be polymerized to form resinous products of general utility. Representative vinyl compounds that are satisfactory as reactants in carrying out this aspect of the invention include butyl vinyl ether, phenyl vinyl ether, dihydropyran, 2,3-dihydro-2-methoxypyran, ketene diethylacetal, phenyl vinyl sulfide, diphenyl vinyl phosphine, and similar substituted and unsubstituted alkyl and aryl derivatives.

The polymeric aziridines of the general type set forth in Example 10 vary in physical conditions from relatively mobile oils to resinous solids. These materials are compatible with a number of other polymeric systems, such as, for example, polyurethanes and epoxy resins, and can be incorporated therein to modify the properties of the basic polymeric system. Also, the solid polyaziridines can be used alone or in combination with other polymers in the molding of commercial plastic articles.

Although the processes and products of the present invention have been described with particular reference to specific embodiments involving unsubstituted reactants and end products, it will be appreciated that it is not so limited and that various substituents can be present in the hydrocarbon portions of either or both reactants.

While the invention has been described with particular reference to specific embodiments, it is not so limited, and it is to be understood that variations and modifications thereof obvious to those skilled in the art may be made without departing from the spirit and scope of the present invention.

The embodiments of the invention in which an exclusive property or privilege is claimed are defined as follows:

1. An ethylene imine derivative of the structure,

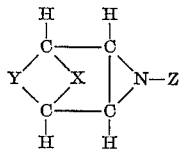

wherein X is selected from the group consisting of sulfur, oxygen, NH and $CH_2$; Y is a divalent hydrocarbon containing at least two and not more than seven carbon atoms; Z is a member of the group consisting of $-SO_2R$, $-PORR'$ and $-PSRR'$; and R and R' are members of the group consisting of alkyl, phenyl, phenylalkyl, phenoxy and phenylalkoxy.

2. An ethylene imine derivative of the formula,

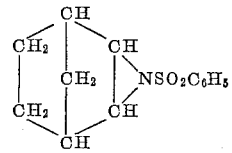

References Cited by the Examiner

Alder et al.: Chemische Berichte, vol. 87 (1954), pp. 1752–59.

ALEX MAZEL, *Primary Examiner.*

NICHOLAS S. RIZZO, HENRY R. JILES, R. PRICE, R. J. GALLAGHER, *Examiners.*

UNITED STATES PATENT OFFICE
CERTIFICATE OF CORRECTION

Patent No. 3,284,444

November 8, 1966

John E. Franz et al.

It is hereby certified that error appears in the above numbered patent requiring correction and that the said Letters Patent should read as corrected below.

Column 3, after the formula in lines 24 to 29, insert the following formula:

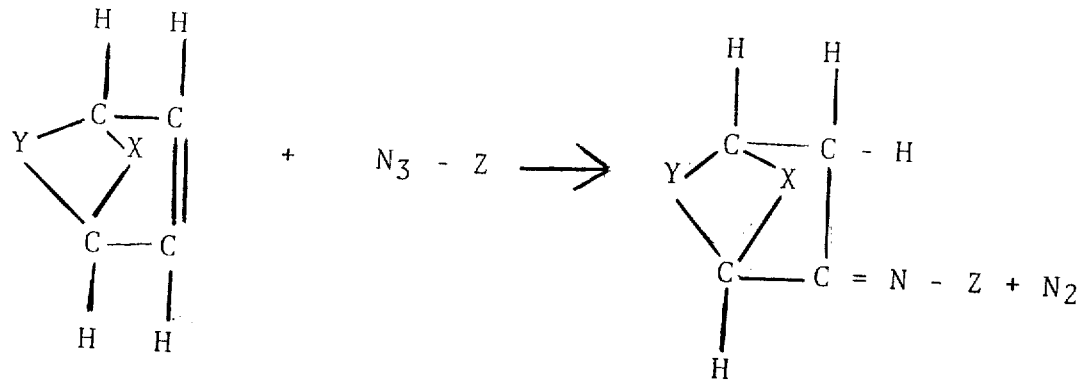

Signed and sealed this 13th day of August 1968.

(SEAL)
Attest:

EDWARD M. FLETCHER, JR.
Attesting Officer

EDWARD J. BRENNER
Commissioner of Patents